United States Patent Office 3,637,630
Patented Jan. 25, 1972

3,637,630
FLUORIDE CATALYSTS FOR PREPARING TRIAZINES AND CROSS-LINKED NITRILE POLYMERS
Edwin Dorfman, Grand Island, N.Y., and William E. Emerson, Barrington, Ill., assignors to Hooker Chemical Corporation, Niagara Falls, N.Y.
No Drawing. Continuation-in-part of application Ser. No. 634,893, May 1, 1967. This application Nov. 12, 1970, Ser. No. 89,106
Int. Cl. C08f 3/74
U.S. Cl. 260—88.7 E
10 Claims

ABSTRACT OF THE DISCLOSURE

This invention relates (A) to a process for producing, preferably at low reaction temperatures, a triazine at high levels of conversion and yield from a haloalkane nitrile such as perfluoroalkane nitriles by the employment of a catalytic amount of a fluoride catalyst of members selected from the group consisting of the Periodic Table Groups I, II–B, III, IV, V–B, VI, VII, VIII, ammonium, hydrates thereof, and fluoride mixtures of said members, and also (B) to the employment of the above-described catalyst in a catalytic amount with a polymer or copolymer containing at least greater than an average of one cyanohaloalkyl group on the chain of a polymer or copolymer, to form a cross-linked polymer or copolymer.

REFERENCE TO PRIOR APPLICATION

This is a continuation-in-part of copending application Ser. No. 634,893, filed May 1, 1967, now abandoned.

BACKGROUND OF THE INVENTION

This invention is directed to a novel process for producing triazine compounds. More particularly, the invention relates to a process for producing triazines from an organic nitrile such as either an aromatic or an haloalkane nitrile in the presence of at least a catalytic amount of a novel catalyst.

Prior to this invention, triazines have been produced from nitriles by the employment of a catalytic amount of particular catalysts such as metal oxides or elemental metals, or various combinations of such materials. Although varying degrees of success have been obtained by the employment of such catalysts, because there remain certain problems which have not altogether been overcome, the search for new methods of producing triazines continues. A process directed to the condensation of nitriles employing metal oxide catalysts is disclosed in applicants' copending application Ser. No. 634,848, filed May 1, 1967, and a typical patent employing combinations of ingredients which jointly have a catalytic effect sufficiently to convert a nitrile into a triazine in U.S. Pat. No. 3,095,414.

One of the problems of typical processes for the conversion of a nitrile into a triazine is the conventional requirement of high temperatures. Another problem relates to the need to obtain both a high yield and a high conversion in the production of the triazine from a nitrile.

Accordingly, it is an object of this invention to obtain a novel process for the production of triazine or mixtures of triazines from one or more nitriles.

Another object is a process of producing a triazine from a nitrile at a high degree of conversion and at a high degree of yield.

Another object is a process of producing a novel triazine composition.

Another object is a process which employs a novel catalyst whereby a nitrile is trimerized to form a triazine.

Another object is a process which employs a low reaction temperature in the production of a triazine from a nitrile.

Another object is a process for the production of triazines from haloalkane nitriles by employment of a novel catalyst.

Another object is a process for cross-linking a polymer or copolymer to form a cross-linked polymer or copolymer.

Another object is a novel cross-linked polymer or copolymer composition.

Other objects become apparent from the above and following disclosure.

SUMMARY

The objects of this invention are obtained by a process comprising contacting (A) at least a catalytic amount of a fluoride catalyst of members selected from the group consisting of the Periodic Table Groups I, II–B, III, IV, V–B, VI, VII, VIII, ammonium, hydrates thereof, and fluoride mixtures of said members, with (B) a member selected from the group consisting of (1) at least one organic nitrile including mixtures of two or more of said organic nitrile, and (2) at least one polymer or copolymer which contains an average of at least more than one nitrile group per molecule of said polymer or copolymer, said contacting being at a temperature and for a time period sufficient to produce, respectively, a composition comprising (1) a triazine composition or (2) a cross-linked polymer or copolymer composition containing said first member.

The preceding paragraph refers to the necessity of an average of at least more than one nitrile group per molecule. Thereby, this invention requires (1) that at least one polymer or copolymer molecule contain two nitrile groups and (2) that each molecule contain at least one nitrile group. Any polymer or copolymer molecule that does not contain at least one nitrile group is not a part of those molecules upon which the average of greater than one per molecule is based; a polymer or copolymer not containing a nitrile group would constitute merely a filler material. In a like manner, the language "at least greater than an average of one cyanofluoroalkyl group per molecule" has the same meaning. Also, it should be noted that the degree of cross-linking increases with a corresponding increase in the number of nitrile groups per molecule. The optimum number of nitrile groups per molecule will therefore depend upon the properties desired for a particular use. Also, the optimum number of nitrile groups on the molecule depends upon the molecular weight of the polymer or copolymer employed. It should be noted that it is within the scope of this invention to employ polymers or copolymers such as triazine polymers which may be degraded by some means such as by milling, for example, to produce fragments, some of which contain the nitrile groups.

Typical metal fluorides within the scope of this invention include the following fluorides: stannous, cadmium, thallous, silver, cobaltous, tantalum, ferrous, gallium, vanadium, niobium, cupric, zinc, sodium, potassium, nickel, stannic, manganous, ferric, chromous, lithium, aluminium, hydrates thereof, and mixtures thereof. The "fluorides" also include the bifluorides.

The most preferred catalysts are selected from the groups consisting of fluoroborate, such as ammonium and silver fluoroborate, stannic fluoride, lithium fluoride, silver fluoride, and aluminum fluoride trihydrate. Another preferred group of catalysts are niobium pentafluoride, gallium trifluoride, zinc fluoride tetrahydrate and chromous fluoride.

A novel aspect of this invention resides in the employment of a novel catalyst as defined above. It has unexpectedly been discovered that by the employment of the catalyst of this invention, one or more of the above objects are thereby obtained, depending upon the particular catalyst employed. Moreover, it has been discovered unexpectedly that by the employment of certain of the preferred catalysts of this invention, the reaction of our invention takes place at unexpectedly low temperatures. The novel catalyst-containing polymer or copolymer compositions of this invention exhibit novel properties different from corresponding polymer or copolymer compositions produced by other methods. The particular properties depend upon which catalyst of this invention, is employed.

The preferred nitrile is a haloalkane nitrile. Within this group is the preferred perhaloalkane nitrile preferably selected from the group consisting of perfluoroctanonitrile, trichloroacetonitrile, 4-bromohexafluorobutylonitrile and mixtures thereof, in which said triazine composition comprises tris(perfluoroheptyl)triazine, tris(trichloromethyl)triazine, tris(3 - bromohexafluoropropyl)triazine, and mixtures thereof. The polymer or copolymer preferably is selected from the group consisting of perfluoroalkylenetriazine polymers and copolymers, perfluoroalkylene ether polymers, perfluoropropylene-vinylidene fluoride copolymers, fluoroalkyl silicone polymers, tetrafluoroethylene-nitrosotrifluoromethane copolymers, each of which contains at least greater than an average of one cyanoperfluoroalkyl group per molecule, and mixtures thereof.

The novel process of this invention includes the steps of curing a polymer of copolymer in which at least greater than an average of one nitrile group per molecule is a part of a cyanohaloalkyl group, in the presence of the above-described catalyst, the curing being (1) at a sufficiently elevated temperature and a period sufficiently long and (2) in the presence of a sufficient number of polymer cyanohaloalkyl groups, to cross-link (vulcanize) to form a cross-linked polymer or a cross-linked copolymer. The process may employ any polymeric composition having at least greater than an average of one cyanohaloalkyl group per molecule in the presence of a catalytic amount of the catalyst of this invention to cross-link to form a cross-linked polymer or copolymer of this invention. The polymers and copolymers of the novel during process exhibit novel properties different from which might appear to be corresponding cross-linked polymers and copolymers produced by other methods. The particular properties depend upon which catalyst of this invention is employed. For example, a novel use of the polymer composition of this invention is the employment as a sealant for high temperature use, and it may be cured in situ.

The organic nitrile which can be employed as the beginning reactant in this invention generally includes any conventional organic nitrile such as those disclosed in U.S. Pat. No. 3,095,414, and copending application U.S. Ser. No. 634,848. Accordingly, organic nitrile listed in the above patent such as:

2-methylbenzonitrile;
3-ethylbenzonitrile;
4-butylbenzonitrile;
3-nitrobenzonitrile;
2-ethyl-4-nitrobenzonitrile;
2,4-dimethylbenzonitrile;
2,6-dimethylbenzonitrile;
2-ethyl-3,4,5-trimethylbenzonitrile;
1-naphthonitrile;
2-naphthonitrile;
3-methyl-1-naphthonitrile;
1-cyanoanthracene;
2-cyanoanthracene;
trichloroacetonitrile;
trimethylacetontrile;
tribromoacetonitrile;
2,2-dichloropropionitrile;
2,2-diodopropionitrile;
2-iodo-2-methylvaleronitrile;
2,2-difluoro-1-decyl cyanide and the like may be employed. Similarly, organic nitriles of the above-cited copending application which are typical beginning reactants for this invention include:

perfluorobutyronitrile;
difluoroacetonitrile;
difluorochloroacetonitrile;
perfluoroglutaronitrile;
perfluorosuccinonitrile;
trifluoroacetonitrile;
pentafluoropropionitrile;
perfluoromalononitrile;
bromotetrafluoropropionitrile;
bromooctafluorovaleronitrile;
nonofluoro-2-thiabutyronitrile;
perfluoroethyladiponitrile;
perfluorosuberonitrile;
perfluorosebaconitrile;
perfluorovaleronitrile;
bromodifluoroacetonitrile;
perfluoroadiponitrile;
perfluorotetradecane dinitrile;
perfluoromethoxypropionitrile;
perfluoroethoxypropionitrile;
perfluorocapronitrile;
3,4-dibromopentafluorobutyronitrile;
trifluoromethylbenzonitrile;
chlorobenzonitrile;
dichlorobenzonitrile;
polychlorobenzonitriles;
perfluorododecane nitrile;
perfluorotetradecane nitrile;
perfluorostearonitrile;
benzonitrile;
2-nitro-4-trifluoromethylbenzonitrile;
perfluorooleonitrile;
m-(trifluoromethylbenzoyl)benzonitrile;
2-phenyl-2,4,4-tetrafluoroacetoacetonitrile;
perfluorobenzonitrile;
nitriles of the formula:

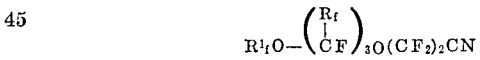

wherein $m$ is one or more, wherein $R_f^1$ is lower perfluoroalkyl and $R_f$ is lower perfluoroalkyl of from 1 to 12 carbon atoms, such as:

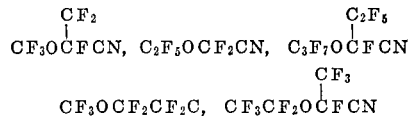

and the like; nitriles of the formula:

$$T(R_f'')O(CF_2)_nCN$$

wherein T is selected from the group consisting of hydrogen and halogen, $R_f''$ is perfluoroalkylene of 1 to 12 carbon atoms, and $n$ is from 1 to 10, such as:

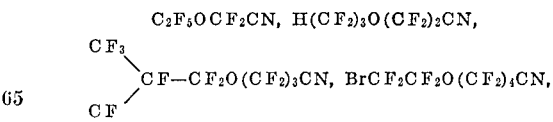

perfluoroisobutyloxypropionitrile; perfluorohexyloxypropionitrile, perfluorooctyloxypropionitrile, and the like; and mixtures of the aforementioned nitriles. It is to be understood that the above-listed organic nitriles are not all inclusive, but are merely intended to illustrate some of the compounds which are contemplated for purposes of this invention.

The reaction time is typically dependent on several factors such as the particular catalyst employed, the amount of catalyst employed, the temperature at which the reaction is carried out, and the degree of conversion desired, for example. A reaction time of from about two hours up to about seven days is normally satisfactory.

The degree of cross-linking for polymers and copolymers of this invention has been found to depend on the number of cyanohaloalkyl groups along the polymer chain, the amount of catalyst used, and on the time and the temperature range which is used in the curing process of the polymer. The polymers which have been cross-linked by this method have been perfluoroalkylenetriazine polymers of a wide range of molecular weight.

Lower molecular weight perfluoroalkylenetriazine polymers which have nitrile groups only at the polymer chain ends have been cured catalytically. Perfluoroalkylenetriazine polymers which have cyanoperfluoroalkyl groups at the 6 position of the triazine ring have also been successfully cured. The percentage of cyanoperfluoroalkyl groups at the 6 position of the triazine ring on these polymer molecules may vary from less than 1 percent up to 100 percent. A preferred percentage is from about 3 percent to 20 percent of nitrile-containing groups in the 6 position of the triazine ring. Perfluoroalkylenetriazine polymers have been described in our copending application U.S. Ser. No. 533,430, filed Mar. 11, 1966, which disclosure is hereby incorporated by reference.

Other fluorine-containing polymers such as the tetrafluoroethylene-trifluoronitrosomethane copolymer might also be cured by these catalytic curing processes. Perfluoroalkylene ether polymers, perfluoropropylene-vinylidene copolymers, and fluoroalkyl silicone polymers and the like, also typically may be cured by this catalyst.

As noted above, the haloalkene nitriles are the preferred reactants for this invention. These nitriles are characteristically trimerized at 190 degrees centigrade or less, in twenty or less hours. Within this group, separate but not necessarily exclusive preferred embodiments are those haloalkane nitriles having at least one fluoro substituent, and secondly, those haloalkane nitriles having at least two halo substituents. A third embodiment which obtains the better results is a haloalkane nitrile which contains at least two fluoro substituents. Typical examples of these various preferred embodiments include perfluorobutyronitrile, perfluorovaleronitrile, perfluorotetradecane dinitrile, perfluoroethoxypropionitrile, difluoroacetonitrile, trifluoroacetonitrile, pentafluoropropionitrile, bromotetrafluoropropionitrile, bromooctafluorovaleronitrile, nonofluoro-3-thiabutyronitrile, monofluoroacetonitrile, trichloroacetonitrile, and the like.

In order to bring about the trimerization reaction, it is merely necessary that the amount of catalyst be sufficient, based on percentage by weight of the nitrile employed to initiate and maintain a trimerization reaction. Except for practical purposes, there is no known maximum amount. However, because the catalyst normally would have to be removed from the reaction product, i.e., separated therefrom, it normally would be desirable to employ as little catalyst as necessary to accomplish the desired result. There would rarely be any need to employ higher than 10 percent of catalyst, based on the weight of the nitrile employed. The minimum amount of catalyst found to be normally necessary is at least about 0.01 percent by weight. The preferred range is from about 0.05 percent to about 10 percent by weight.

The nitrile trimerization reaction may be run in any solvent which does not adversely react with the ntirile, the catalyst, or the reaction products of the nitrile and catalyst. Suitable solvents include e.g., n-butyl acetate, carbon tetrachloride, ortho-chlorotoluene, chlorobenzene, nitrobenzene, cyclohexanone, ortho-dichlorobenzene, diethylcarbitol, dimethylsulfoxide, dioxane, ethyl acetate, and the like. This list is merely illustrative, and does not purport to describe the vast number of solvents which can be used in the process of this invention. Similarly, such solvents may be employed with the polymer or copolymer composition (mixture) or this invention, for uses such as paints, sealants, and coatings.

The process of this invention is normally operable at a temperature of from zero to about 400 degrees centigrade, though it is preferably practiced in the zero degree centigrade to about 250 degree centigrade range depending upon the particular catalyst employed, more preferably above about 15 degrees centigrade, including a preferred trimerization range of from about 70 degrees centigrade to about 200 degrees centigrade, and including a curing temperature up to preferably about 190 degrees centigrade for the polymer or copolymer. Although it is normally desirable that the temperature employed be near room temperature if a good yield and conversion can be obtained, it is solely by the employement of particular preferred embodiments of this invention that it is possible to produce satisfactory yields at this low temperature, for example.

The triazine and cross-linked polymer or copolymer products produced by this invention are typically useful in applications requiring high-temperature stability and chemical stability. The specific triazines produced by this invention are useful both as high temperature lubricants and solvents, whereas the polymer or copolymer produced when a dinitrile is condensed is useful in preparing highly heat-resistant molded articles.

The following examples are not intended to limit the invention disclosed herein, but rather to illustrate the invention. All percentages are based on percent of theory unless otherwise stated, all parts are by weight and temperatures are given in degrees centigrade unless indicated otherwise.

EXAMPLE 1

Perfluorobutyronitrile, 10 parts, and silver fluoride, 0.43 parts, were heated at 100 degrees centigrade for 17½ hours in a sealed tube. Infrared examination of the product showed it to be essentially 100% tri-(perfluoropropyl)-triazine with only a trace of perfluorobutyrynitrile remaining.

EXAMPLES 2–27

The general procedure of Example 1 was repeated for Examples 2 through 27, in the trimerization of 3.56 parts of perfluorooctanonitrile under the conditions and obtaining the yield and conversion illustrated in Table 1 below. Five mole percent (based on nitrile) of catalyst was employed for each example, at a trimerization temperature of about 190 degrees for about twenty hours.

TABLE 1

| Example No. | Catalyst employed | Triazine Percent yield | Percent conversion |
|---|---|---|---|
| 2 | Stannous fluoride | 100 | 4 |
| 3 | Cadmium fluoride | 100 | 1 |
| 4 | Thallous fluoride | 100 | 1 |
| 5 | Silver fluoride | 100 | *55 |
| 6 | Cobaltous fluoride | 100 | 1 |
| 7 | Tantalum pentafluoride | 100 | 4 |
| 8 | Ferrous fluoride | 100 | 4 |
| 9 | Gallium trifluoride | 100 | 6 |
| 10 | Vanadium tetrafluoride | 100 | 3 |
| 11 | Niobium pentafluoride | 100 | 6 |
| 12 | Cupric fluoride | 100 | 9 |
| 13 | Zinc fluoride tetrahydrate | 100 | 7 |
| 14 | Sodium bifluoride | 100 | 14 |
| 15 | Ammonium fluoroborate | 100 | 37 |
| 16 | Silver fluoroborate | 100 | 34 |
| 17 | Potassium bifluoride | 100 | 4 |
| 18 | Nickel fluoride | 100 | 34 |
| 19 | Stannic fluoride | 100 | 22 |
| 20 | Zirconium fluoride | 100 | 10 |
| 21 | Manganous fluoride | 100 | 8 |
| 22 | Ferric fluoride | 100 | 9 |
| 23 | Chromous fluoride | 100 | 13 |
| 24 | Potassium fluoride | 100 | 5 |
| 25 | Sodium fluoride | 100 | 2 |
| 26 | Lithium fluoride | 100 | 20 |
| 27 | Aluminum fluoride trihydrate | 100 | 21 |

*This experiment was run at 100° C.

Of the catalysts of Table I it is seen that the fluoroborates, stannic fluoride, lithium fluoride, silver fluoride, and aluminum fluoride trihydrate are the most preferred catalysts. The catalysts niobium pentafluoride, gallium trifluoride, zinc fluoride tetrahydrate, sodium bifluoride, and chromous fluoride are a second preferred group of catalysts.

Based on other experimental results, catalysts such as the fluorides of trivalent cobalt, chromic, mercuric, manganic, lead, and titanium are least effective, requiring trimerization conditions in excess of 190 degrees centigrade for about twenty hours or more.

EXAMPLES 28–34

A perfluoroalkylenetriazine polymer containing from one to 20 cyanoperfluoropropyl groups for every 99 to 80 perfluoropropyl groups respectively in the polymer chain is mixed with 5 percent by weight of catalyst (1 gram polymer per 0.05 gram catalyst) as shown in the following table. The mixtures are then heated at the temperatures shown and for the periods of time indicated to produce cross-linked polymers as indicated by the fact the resulting products are insoluble in hexafluoroxylene.

| Example No. | Catalyst | Temperature (° C.) | Time (hours) |
|---|---|---|---|
| 28 | Ammonium fluoroborate | 190 | 20 |
| 29 | Silver fluoride | 190 | 20 |
| 30 | Stannic fluoride | 190 | 20 |
| 31 | Lithium fluoride | 190 | 20 |
| 32 | Silver fluoroborate | 190 | 20 |
| 33 | Nickel fluoride | 190 | 20 |
| 34 | Aluminum fluoride trihydrate | 190 | 20 |

It is to be understood that the specification, including the examples, are only illustrative of the invention claimed herein, and that it is within the scope of this invention to employ equivalents obvious to one skilled in the art.

We claim:

1. A process for preparing a cross-linked polymer or copolymer composition which comprises reacting at least one perfluoroalkylene triazine polymer or copolymer which contains at least one polymer or copolymer molecule containing two nitrile groups and wherein each molecule contains at least one nitrile group, in the presence of a catalytic amount of a fluoride catalyst of members selected from the group consisting of the Periodic Table Groups I, II–B, III, IV, V–B, VI, VII, VIII, ammonium, hydrates thereof, and fluoride mixtures of said members, at a reaction temperature of about 0 to 400 degrees centigrade.

2. The process of claim 1 wherein the fluoride catalyst is selected from the group consisting of stannous, cadmium, thallous, silver, cobaltous, tantalum, ferric, ferrous, gallium, vanadium, niobium, cupric, zinc, sodium, zirconium, potassium, nickel, stannic, manganous, chromous, lithium, aluminum, and ammonium, fluoride hydrates thereof, and mixtures thereof, wherein the reaction temperature is from about 0 to about 190 degrees centigrade, and wherein each nitrile group is part of a cyanohaloalkyl group.

3. The process according to claim 2 wherein the alkylene groups of the cyanohaloalkyl groups are each selected from the group consisting of methylene, ethylene, propylene, butylene, pentylene, hexylene, heptylene, octylene, nonylene and decylene.

4. A process according to claim 3 in which the catalyst comprises ammonium fluoroborate.

5. A process according to claim 3 in which the catalyst comprises silver fluoride.

6. A process according to claim 3 in which the catalyst comprises stannic fluoride.

7. A process according to claim 3 in which the catalyst comprises lithium fluoride.

8. A process according to claim 3 in which the catalyst comprises silver fluoroborate.

9. A process according to claim 3 in which the catalyst comprises nickel fluoride.

10. A process according to claim 3 in which the catalyst comprises aluminum fluoride trihydrate.

References Cited

UNITED STATES PATENTS

| 3,060,179 | 10/1962 | Toland | 260—248 |
| 3,369,002 | 2/1968 | Griffin | 260—78.4 |
| 3,470,176 | 9/1969 | Zollenger | 260—248 |
| 3,542,660 | 11/1970 | Gundahl | 260—248 X |

MORRIS LIEBMAN, Primary Examiner

R. ZAITLEN, Assistant Examiner

U.S. Cl. X.R.

252—441; 260—2 M, 37 N, 248 CS